United States Patent
Morin et al.

(10) Patent No.: US 10,394,688 B2
(45) Date of Patent: Aug. 27, 2019

(54) METHOD FOR DETECTING COMPUTER MODULE TESTABILITY PROBLEMS

(71) Applicant: SAFRAN ELECTRONICS & DEFENSE, Boulogne-Billancourt (FR)

(72) Inventors: Severine Morin, Boulogne-Billancourt (FR); Bertrand Tavernier, Boulogne-Billancourt (FR); Fabrice Coroller, Boulogne-Billancourt (FR); Stephane Bigonneau, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/063,991

(22) PCT Filed: Dec. 21, 2016

(86) PCT No.: PCT/EP2016/082134
§ 371 (c)(1),
(2) Date: Jun. 19, 2018

(87) PCT Pub. No.: WO2017/108924
PCT Pub. Date: Jun. 29, 2017

(65) Prior Publication Data
US 2019/0004928 A1    Jan. 3, 2019

(30) Foreign Application Priority Data
Dec. 21, 2015   (FR) ..................... 15 62987

(51) Int. Cl.
*G06F 11/36* (2006.01)
*G06F 16/28* (2019.01)
(Continued)

(52) U.S. Cl.
CPC .......... *G06F 11/3616* (2013.01); *G06F 8/35* (2013.01); *G06F 11/3604* (2013.01);
(Continued)

(58) Field of Classification Search
USPC ....................................... 717/124
See application file for complete search history.

(56) References Cited

U.S. PATENT DOCUMENTS

| | | | |
|---|---|---|---|
| 5,457,638 A * | 10/1995 | Ashar ............ | G01R 31/318328 716/108 |
| 5,513,118 A * | 4/1996 | Dey ............... | G01R 31/318586 714/726 |

(Continued)

FOREIGN PATENT DOCUMENTS

| | | | |
|---|---|---|---|
| CA | 2273628 A1 * | 12/1999 | ..... G01R 31/318364 |
| FR | 3026511 A1 | 4/2016 | |
| WO | WO-9938024 A1 * | 7/1999 | ......... G01R 31/2848 |

OTHER PUBLICATIONS

Le Traon et al. "testability measurements for dataflow designs", Nov. 1997, Proceedings Fourth International Software Metrics Symposium. (Year: 1997).*

(Continued)

*Primary Examiner* — Jason D Mitchell
(74) *Attorney, Agent, or Firm* — Womble Bond Dickinson (US) LLP

(57) ABSTRACT

The present invention relates to a computer module testability problem detection method defined: on the one hand, by first code instructions in a modeling language representing blocks, divided up into one or more components, and relationships between the blocks and/or the components, and on the other hand, by second code instructions in a textual language representing a list of specifications that are each associated with a capability and define at least one information flow at the capability. The method is characterized in
(Continued)

that it includes implementing, by means of a data processing means (11) of a device (1), steps for: (a) expressing the first and second code instructions, each code being in the form of a model instantiating a common meta-model that correlates them with each other, (b) synchronizing the related models into a consolidated model, (c) expressing a graph on the basis of said consolidated model, (d) calculating, by means of a graph traversal algorithm, the width and/or depth of the graph, and (e) sending a signal indicating a computer module testability problem if at least one of said calculated width and depth is greater than a predefined threshold.

10 Claims, 12 Drawing Sheets

(51) Int. Cl.
  *G06F 16/901* (2019.01)
  *G06F 8/35* (2018.01)
(52) U.S. Cl.
  CPC ........ *G06F 11/3676* (2013.01); *G06F 16/288* (2019.01); *G06F 16/9024* (2019.01)

(56) References Cited

U.S. PATENT DOCUMENTS

| | | | | |
|---|---|---|---|---|
| 6,028,988 | A * | 2/2000 | Asaka | G06F 11/2236 714/E11.166 |
| 2004/0040014 | A1* | 2/2004 | Ball | G06F 11/3616 717/130 |
| 2004/0046763 | A1* | 3/2004 | Ball | G06F 11/3616 345/581 |
| 2005/0097515 | A1* | 5/2005 | Ribling | G06F 11/3672 717/124 |
| 2006/0167876 | A1* | 7/2006 | Benitez | G06F 16/489 |
| 2006/0195822 | A1* | 8/2006 | Beardslee | G01R 31/31705 717/124 |
| 2010/0131917 | A1* | 5/2010 | Iwamasa | G06F 8/10 717/104 |
| 2011/0231828 | A1* | 9/2011 | Kaulgud | G06F 8/77 717/131 |
| 2014/0164349 | A1* | 6/2014 | Cudak | G06F 15/16 707/709 |
| 2014/0282319 | A1* | 9/2014 | Xu | G06F 17/5036 716/108 |
| 2016/0055072 | A1* | 2/2016 | Baloch | G06F 11/368 714/38.1 |

OTHER PUBLICATIONS

Nguyen et al. "testability analysis of data flow software", 2005, Electron. Notes Theor. Computer Sci. (Year: 2005).*

Nguyen et al. "transition based testability analysis for reactive systems", Jun. 2011, 2011 IEEE International conference on computer science and automation engineering. (Year: 2011).*

Robach, Chantal, "Analyse de testabilite de systemes flot de donnees", Available at: URL:http://www.acotris.c-s.fr/CRReunion/1-SysLogCritiques/14Nov/13-robach.pdf, Nov. 14, 2000, pp. 1-83.

Preliminary Research Report and Written Opinion received for French Application No. 1562987, dated Oct. 25, 2016, 7 pages (1 page of French Translation Cover Sheet and 6 pages of original document).

Nguyen et al., "Transition-Based Testability Analysis for Reactive Systems", 2011 IEEE International Conference On Computer Science and Automation Engineering (CSAE), IEEE, Jun. 10, 2011, pp. 551-557.

International Search Report and Written Opinion received for PCT Patent Application No. PCT/EP2016/082134, dated Feb. 10, 2017, 16 pages (8 pages of English Translation and 8 pages of Original Document).

International Preliminary Report on Patentability received for PCT Patent Application No. PCT/EP2016/082134, dated Jul. 5, 2018, 14 pages (8 pages of English Translation and 6 pages of Original Document).

Doumbia, Fassely, "Contribution to the testability analysis of reactive real-time systems: supporting systems validation and verification," Available at: URL:https://tel.archives-ouvertes.fr/tel-00481072/document, Jan. 1, 2010, 265 pages, (English Abstract Submitted).

Bousquet et al., "Analysis of Testability Metrics for LUSTRE/SCADE Programs", 2010 Second International Conference on Advances in System Testing and Validation Lifecycle, IEEE, Aug. 22, 2010, pp. 26-31.

* cited by examiner

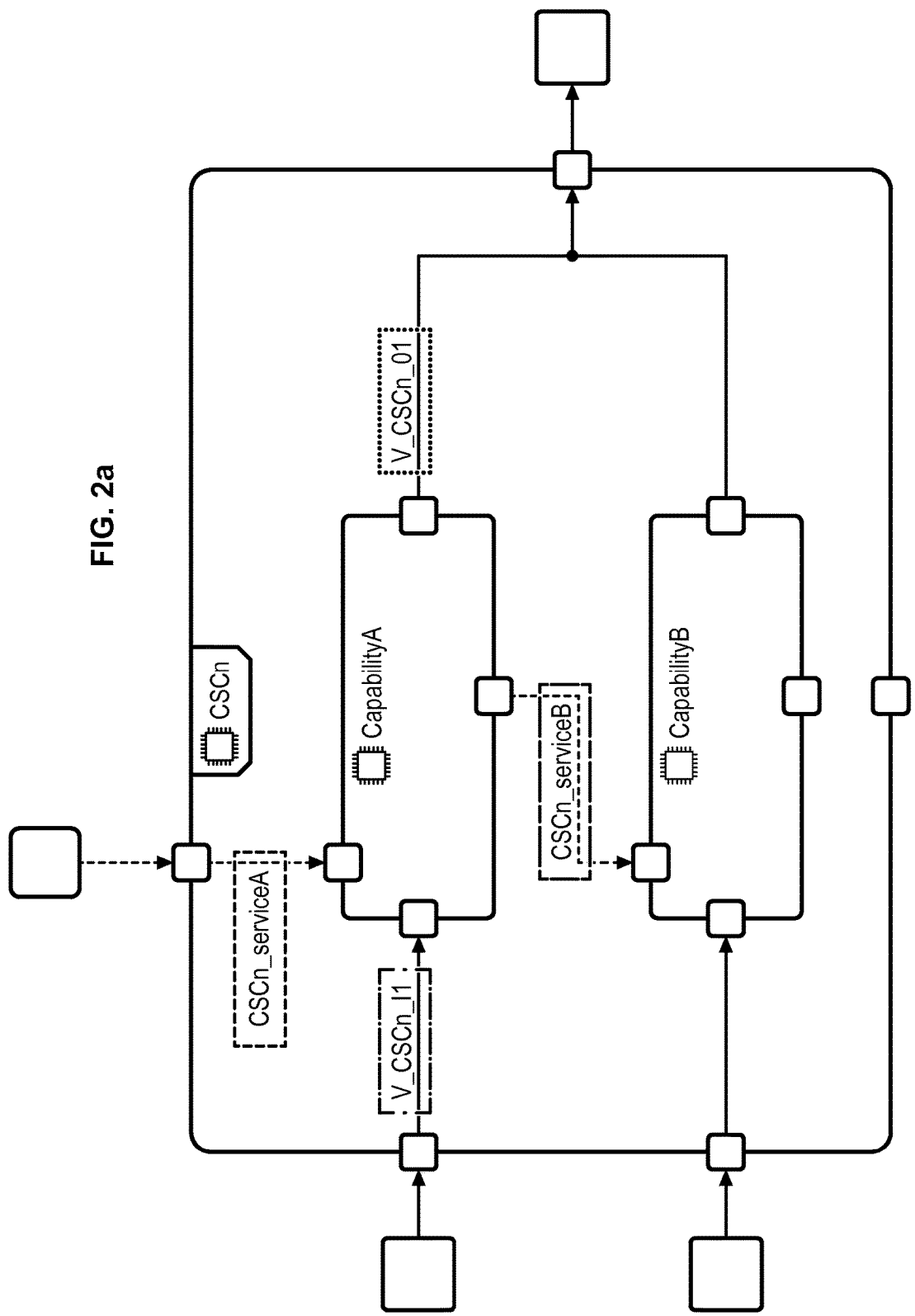

FIG. 2b

<<In SRD CSCI A / CSCn-chapters"<CapabilityA> Requirements">>

REQ.PROJ-CSCI_A-SRD-0001-01
[COV.REQ.PROJ-PRODUCT-SSDD-0010]
WHEN {V_CSCn_I1} is ..., THEN the CapabilityA shall compute {v_L1}such as: ...,
OTHERWISE the CapabilityA shall compute {v_L1} such as: ...
*[END_REQ.PROJ-CSCI_A-SRD-0001]*

REQ.PROJ-CSCI_A-SRD-0002-01
[COV.REQ.PROJ-PRODUCT-SSDD-0011]
The CapabilityA shall compute validity {V_CSCn_01} of data {v_L1}, with a consolidation time of 100 ms, by calling {CSCn_serviceA}
*[END_REQ.PROJ-CSCI_A-SRD-0002]*

REQ.PROJ-CSCI_A-SRD-0003-05
[COV.REQ.PROJ-PRODUCT-SSDD-0010]
[COV.REQ.PROJ-PRODUCT-SSDD-0011]
The CapabilityA shall provide {CSCn_serviceB} that gives the last valid value of {v_L1}
*[END_REQ.PROJ-CSCI_A-SRD-0003]*

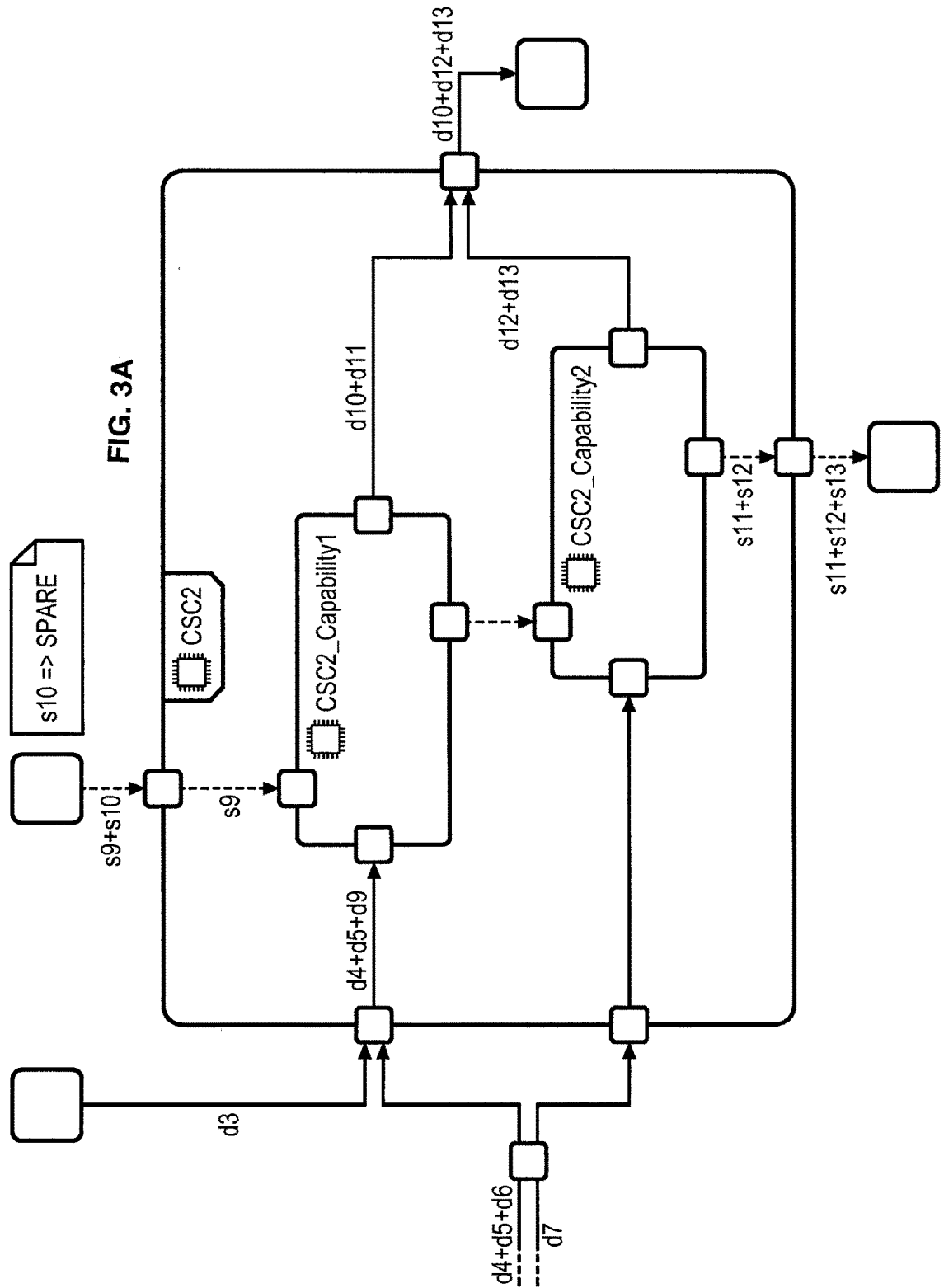

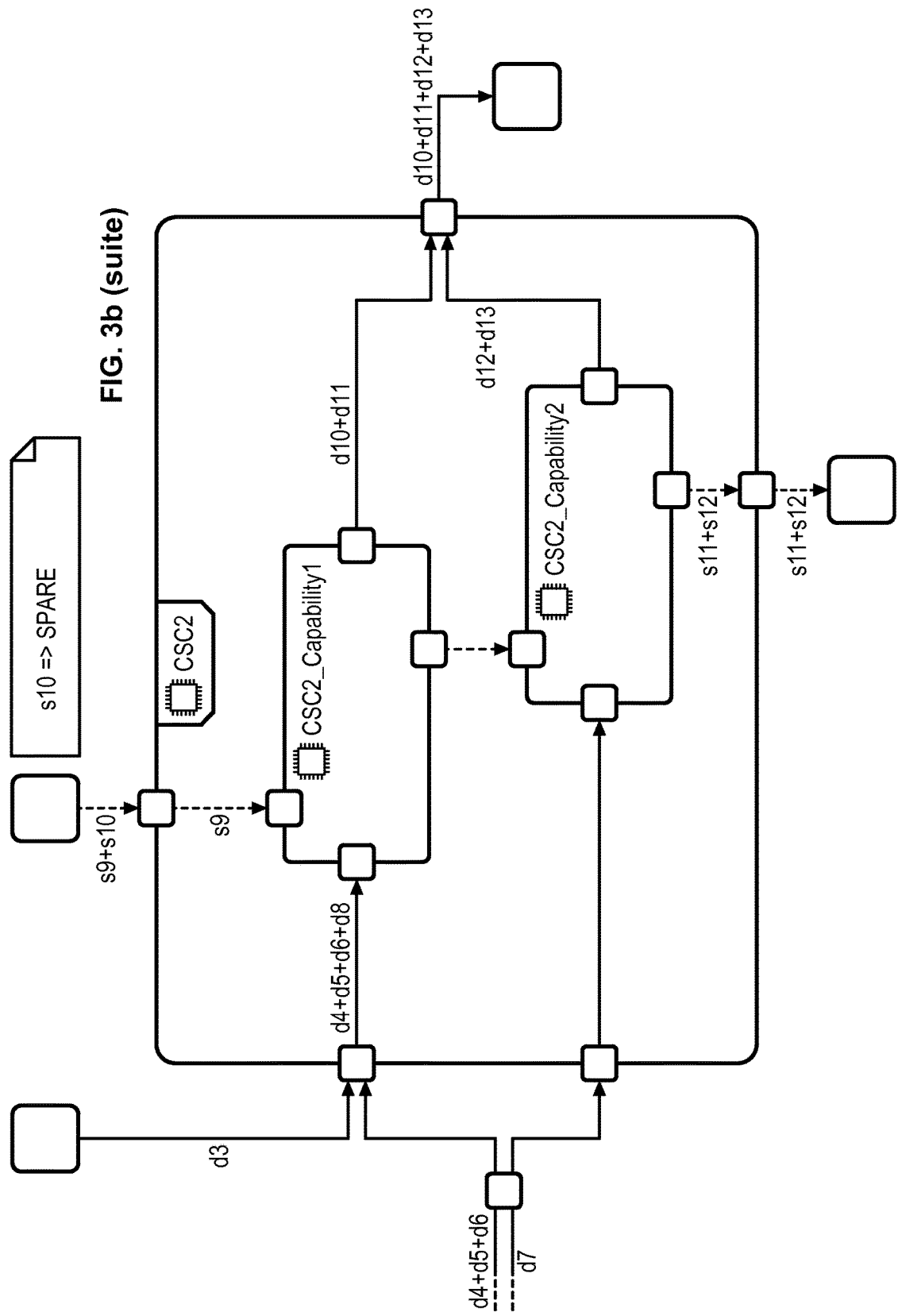

METHOD FOR DETECTING COMPUTER MODULE TESTABILITY PROBLEMS

GENERAL TECHNICAL FIELD

The present invention relates to the specification and architecture of modules from system engineering and equipment engineering activities. This invention includes in particular a method for detecting testability problems of a computer module.

PRIOR ART

The latest generation of aircrafts rely heavily on computing and use electronic devices for this which embed the software.

The standards ARP4754 and DO-178 set the safety conditions applicable to the electronic devices embedding critical software used in aircraft.

They have five levels of criticality (from A to E) called DAL ("Development Assurance Level") levels, culminating in level A: a failure in the system or sub-system studied may cause a catastrophic problem that could compromise the safety of the flight or landing, or even cause a plane crash.

According to the DAL level adopted for the system, the proofs to be provided regarding the effectiveness of the development process, and with regard to the reliability of the resulting product, are variable in number. Thus, the degree of formal description of the architectures and specifications of the product will depend on the DAL level. Subsequently, test procedures must allow the properties of the product to be verified for ensuring that these properties correctly meet the requirements set out in the specifications.

An effort is being focused today on obtaining a reliable and reproducible method for automating the testing of critical software components (up to level DO-178 DAL A), whether they are generated automatically or manually, and this regardless of the complexity of the systems to be tested.

Accordingly, patent application FR1459321 provides a test framework offering excellent results.

However, it is found that the effort of verification could be reduced upstream, on the one hand by anticipating difficulties of "non-testability" (e.g. some components of a product architecture prove poorly instrumented and some tests may not be implemented, which prevents a complete verification of the product) and on the other hand by limiting the phenomenon known as "over-specification" which artificially and unnecessarily multiplies the number of requirements (which will subsequently have to be verified).

Indeed, although the root causes of these testability problems (the term "testability problems", will generally refer to problems affecting the implementation of the tests and in particular will be understood to mean both non-testability and over-specification errors) are very often the result of the activity of architecture, their effects only appear belatedly insofar as they are only detected during the verification of the implemented product, leading repeatedly to delays, and associated costs.

Then, only non-testability errors are generally processed, over-specification often being retained in the product (since detected too late for being corrected without the risk of calling into question the credit already obtained during the tests). This type of waste has an impact throughout the service life of the product (problems of maintainability, etc.).

It would thus be desirable to have a reliable, easy solution for detecting the risk of over-specification and non-testability (and generally to deal with testability problems) from the product architecture and specification phases, so as to substantially reduce the cost and time of the verification and certification procedures.

DESCRIPTION OF THE INVENTION

According to a first aspect, the present invention therefore relates to a method for detecting testability problems of a computer module defined:

on the one hand by first code instructions in a modeling language, said first code instructions representing a plurality of blocks of said computer module distributed in one or more components and a plurality of relationships between the blocks and/or the components;

on the other hand by second code instructions in a textual language, said second code instructions representing a list of specifications each associated with a capability and defining at least one information flow at the level of the capability;

the method being characterized in that it comprises implementing by data processing means of a device steps of:

(a) Expressing the first and second code instructions each in the form of a model instantiating a common meta-model matching on the one hand the blocks with the capabilities, and on the other hand said relationships with said information flows;

(b) Synchronizing the models associated respectively with the first and second code instructions in a consolidated model;

(c) Expressing from said consolidated model a graph in which the blocks and the components are nodes, and the relationships are edges;

(d) Calculating by means of a graph traversal algorithm the width and/or the depth of said graph;

(e) Emitting a signal indicating a testability problem of the computer module if at least one of said calculated width and depth is greater than a predefined threshold.

According to other advantageous and non-restrictive features:

said modeling language is a graphical programming language, and said textual language is a requirement description language;

said predefined threshold is three;

step (d) also comprises calculating the number of components in the module, the number of blocks for each component, and the number of specifications for each block, step (e) also comprising emitting a signal indicating a testability problem of the computer module if at least one of these calculated numbers is greater than a predefined threshold;

step (b) first comprises verifying the consistency of the models associated respectively with the first and second code instructions, step (e) also comprising emitting a signal indicating a testability problem of the computer module if at least one inconsistency is identified between the models;

the width of the graph corresponds to the largest number of blocks along a path in the edges of the graph representative of data type information flows, between two observable data type pieces of information;

the depth of the graph corresponds to the largest number of blocks along a path in the edges of the graph representative of command type information flows, between two observable command type pieces of information;

an observable piece of information is an input or output piece of information of a component, or a piece of information provided by an instrumentation block;

the method comprises a subsequent step (f) of generating code instructions in a procedural programming language from the first code instructions if no testability problem is reported in step (e);

the method comprises a subsequent step (f) of instantiation in a system of code instructions generated in a procedural programming language.

According to a second aspect, the invention relates to a device for detecting testability problems of a computer module defined:

on the one hand by first code instructions in a modeling language, said first code instructions representing a plurality of blocks of said computer module distributed in one or more components and a plurality of relationships between the blocks and/or the components;

on the other hand by second code instructions in a textual language, said second code instructions representing a list of specifications each associated with a capability and defining at least one information flow at the level of the capability;

the device being characterized in that it comprises data processing means configured for implementing:

a module for expressing the first and second code instructions each in the form of a model instantiating a common metamodel matching on the one hand the blocks with the capabilities, and on the other hand said relationships with said information flows;

a module for synchronizing the models associated respectively with the first and second code instructions in a consolidated model;

a module for expressing from said consolidated model a graph in which the blocks and the components are nodes, and the relationships are edges;

a module for calculating by means of a graph traversal algorithm the width and/or the depth of said graph;

a module for emitting a signal indicating a testability problem of the computer module if at least one of said calculated width and depth is greater than a predefined threshold.

According to a third and a fourth aspect, the invention relates to a computer program product comprising code instructions for executing a method according to the first aspect of the invention for detecting testability problems of a computer module; and storage means readable by a computer device on which a computer program product comprises code instructions for executing a method of the first aspect of the invention for detecting testability problems of a computer module.

DESCRIPTION OF THE FIGURES

Other features and advantages of the present invention will appear on reading the following description of a preferred embodiment. This description will be given with reference to the appended drawings in which:

FIGS. 2a-2b respectively represent examples of first and second instructions for the same computer module;

DETAILED DESCRIPTION

Hardware Environment

Figure 1:
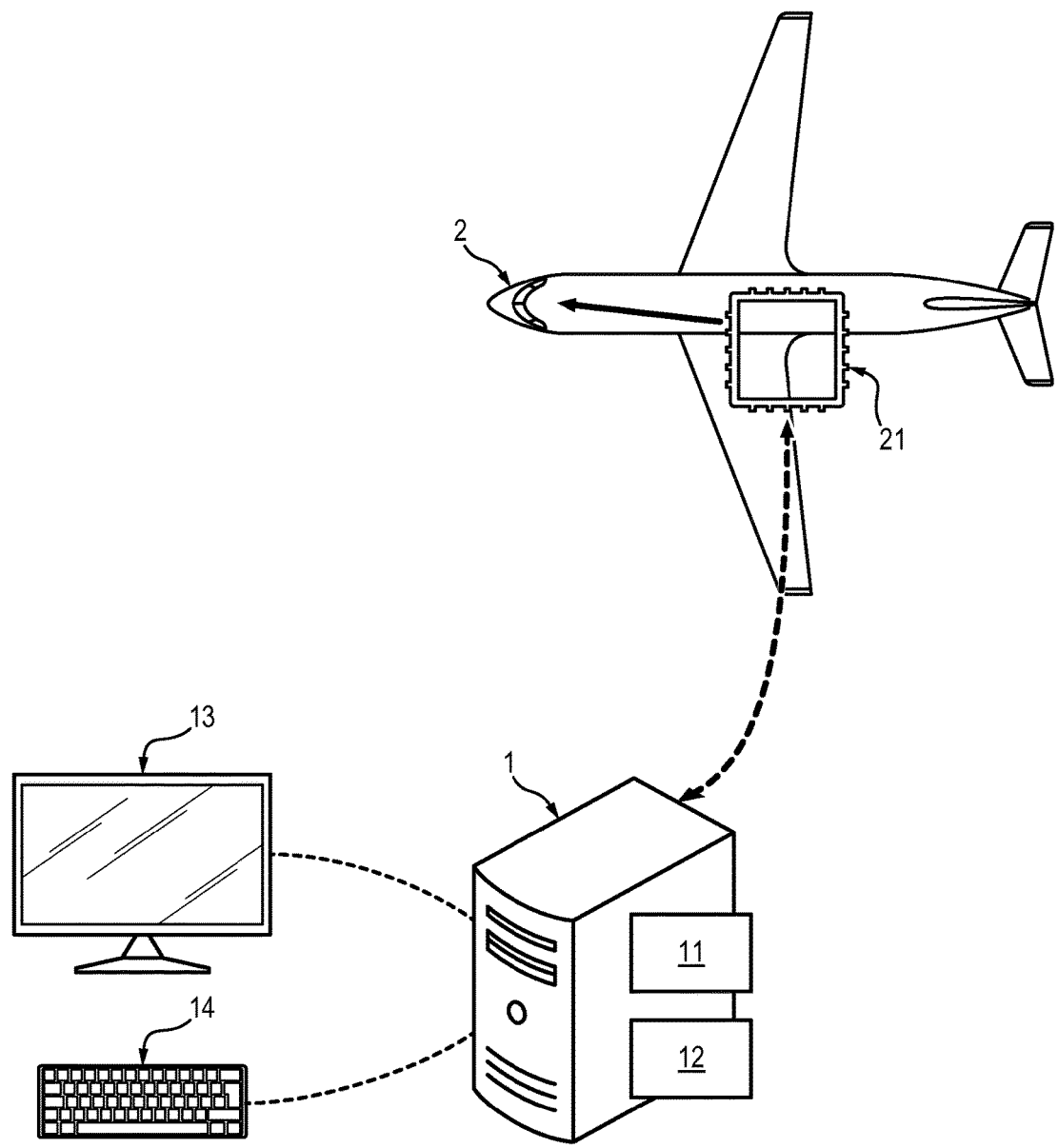
FIG. 1 represents a system for implementing the method according to the invention.

With reference to FIG. 1, the present method is a method for detecting testability problems of a computer module.

The method is implemented via a device 1 which may be any computer station comprising data processing means 11 (e.g. a processor), data storage means 12 (e.g. a hard disk) and graphical interface display means 13 (e.g. a screen).

The input means 14 (such as a keyboard and a mouse) enable a user wishing to use the method (and/or graphically program) to interact with the graphical interface 13. It should be noted that the present method is not limited to the use of a workstation, and that other types of devices such as a server may of course be used.

Code Instructions

As explained, the present method may be implemented upstream of the design of the computer module.

Thus "computer module" is understood to mean above all first code instructions in a modeling language (a graphical programming language such as that offered by tools of the Artisan Studio, Rhapsody, Enterprise Architect, SIRIUS type) from which code instructions will subsequently be generated in a procedural programming language (or algorithmic: procedural programming language is understood to mean a programming paradigm in which a "procedure" simply contains a series of steps to be performed, to each of which other procedures may be called, or even the procedure itself (recursion). These instructions constitute a source code, in a procedural language like C (or, for example, an object oriented language of the Java type), intended to be compiled into an executable code and then to be embedded (the terminology "buried" is used for illustrating the fact that the module is inaccessible by a user) on a computer 21 of an apparatus 2, in particular a vehicle such as an aircraft, a safety device such as a mission planning and restitution system or an individual combat system, etc.

The computer module may be software and/or hardware, i.e. all or part of its components (see farther on) may be, in short, in the form of a set of loadable and executable data ("software"), or directly in the form of a device having a physical configuration allowing the implementation of the functionalities provided.

In the first case, embedding consists generally in writing the code of the software component in a memory (in particular read-only) of the computer 21, with a view to execution by a processor of the computer 21. In the second case, where the module is typically implemented by an FPGA type logic circuit, embedding consists in a suitable reconfiguration of the logic circuit (forming part of the computer 21), or in producing an ASIC type integrated circuit ("Application-Specific Integrated Circuit") in accordance with the configuration of the FPGA and its integration in the computer 21. The present method will not be limited to any of these cases insofar as it relates to the upstream part of the production of the module, regardless of its subsequent implementation conditions.

In the event of generating instructions in the procedural programming language, the data processing means 11 generate and store these code instructions on the data storage means 12 using a library of rules for generating said procedural programming language from the modeling language.

It will be understood that the automatic generation of code and its embedding are techniques well known to the person skilled in the art which are optional in the present method.

The present method thus only needs:
- on the one hand first code instructions in a modeling language (which define "the functional architecture" and "the organic architecture" of the module); and
- on the other hand second code instructions in a textual language (which define the "specifications" of the module);

The first and second code instructions are both related and complementary, and are both necessary for fully defining the module and allowing it to be verified.

The first code instructions represent the overall and functional architecture of the module, and express it in a plurality of blocks of said computer module distributed in one or more components (i.e. groups of blocks) and a plurality of relationships between the blocks and/or the components. In other words, the module comprises one or more components, each component comprising one or more blocks (also called "capabilities") that define a functional unit, i.e. a function or part of a function projected onto the component.

Each block receives inputs, processes them, and emits outputs (notably to other blocks), so as to establish information flows (i.e. information inputs and/or outputs) between the blocks. The first instructions define this as a plurality of relationships between the blocks and/or the components.

The relationships, also called "linkages", thus relate either to data, e.g. values of continuously supplied quantities, discrete values or even function parameter values; or to commands, e.g. synchronization events like function calls, interrupts, sequencing, etc.

It will therefore be understood that the information may be of the data type or the command type, and the term information will be used for designating either of the two types of information interchangeably, i.e. both data and commands.

The information may be either local (i.e. it only exists within the component) or entering/exiting the component (i.e. received from the outside or transmitted to the outside).

Each block (and similarly each component) exhibits at least one piece of input information and/or at least one piece of output information, i.e. at least one information flow at the level of the block.

Such a representation makes it possible to have an overall view of the architecture of the module, with the interactions between blocks (component, function and/or capability). One example is seen in FIG. 2*a*.

The second code instructions in their turn appear in the form of a list of specifications, i.e. as explained, of requirements to be met by the module. The language of the second instructions is a textual language, in particular a dedicated requirement description language. The DOORS software DXL will be cited as an example. The specifications/requirements are each associated with a capability and define a list of information flows (of information inputs and/or outputs) at the level of the capability (it will be understood that the term capability is used for the specifications and the term block is used in the architecture, but that it is the same entity once a function has been projected onto a component). More specifically, each "paragraph" of the second instructions corresponds to all the specifications associated with a capability, and therefore defines this capability. Each specification is expressed as a condition (typically in pseudo-language) relating to the inputs or the outputs of the block corresponding to the capability, as is seen in FIG. 2*b* which represents an example of specifications corresponding to the architecture of FIG. 2*a*.

As can be seen the architecture and the specifications comprise different contents, but must have consistency. For example, each output involved in a specification of a capability must be reflected in the relationships of the corresponding block of the architecture, failing which errors may be found in the product following the reference system (specification or architecture) used by the developer. These inconsistencies may also lead to the specification not being fully verified (see the encircled variables in each of FIGS. 2*a* and 2*b*).

Usually, the specifications define the set of conditions that must be respected in creating the architecture (in other words, the first instructions are written knowing the second instructions), which is why inconsistencies between the first and the second code instructions should normally not take place. It will be seen later on that in a preferred embodiment consistency is also verified.

Method

The present method is aimed at detecting potential testability problems, in this case "non-testability" (impossibility of directly verifying the behavior of a block, examples will be seen farther on) and "over-specification" (unnecessary complexity of the specifications).

For this, the method begins by implementing through the data processing means 11 a step (a) of expressing the first and second code instructions each in the form of a model instantiating a common metamodel matching said relationships with said information flows.

More specifically, it has been explained that the first and the second instructions each contain a common share of content, and a specific share (e.g. the architecture of the components is specific to the first instructions, and the content of the specifications is specific to the second instructions). The metamodel defines a common format which compares the first and second instructions, and identifies the pivot elements. This metamodel format may be implemented in two separate tools, an architecture management tool and a specification management tool, e.g. so as to automatically provide information for each of the two models as soon as the first and/or the second code instructions are worked upon.

The model associated with the first instructions and the model associated with the second instructions each correspond to an instance of the metamodel (i.e. a representation of the first/second instructions in accordance with said common format).

Based on the block/capability equivalence, the metamodel matches said relationships (in the architecture) with said information flows (in the specifications), which indeed correspond to the same concepts.

The associated format is typically based on a generic markup language such as XML (eXtensible Markup Language) or a dedicated language (DSL, Domain Specific Language).

Suitable tools are known, e.g. Artisan Studio, Rhapsody, Enterprise Architect, or SIRIUS for the architecture part (the instantiation of the metamodel is performed using Java scripts), and DOORS, already mentioned, or Polarion, PTC Integrity for the specifications part (the instantiation of the metamodel is performed using DXL scripts). Moreover, technologies are known such as Capella having already developed their DSL that is usable for the meta-model.

In a second step (b), the data processing means 11 synchronize in a consolidated (i.e. mutually enriched, i.e. pooling their content) model the models associated respectively with the first and second code instructions: the consolidated model comprises all the information carried by each of the architecture/specification models.

In a first variant, the assumption is made that there is no inconsistency between the first and the second code instructions, i.e. that the "duplicate" content is not contradictory. Synchronization consists simply in combining all the information found in one and/or the other of the models.

Synchronization may then be on demand, and preferably it takes place continuously.

It is indeed possible to link the architecture model and the specification model so that any impact on one of the models is automatically transposed onto the others and vice versa, in other words they are in bijection. This makes it possible to "propagate" any update. For example, any change in content of the requirement reference system (adding a datum to be calculated, etc.) has a visible impact on the architecture.

In a second variant (e.g. if synchronization has not been performed along the way), inconsistencies may exist between the first and the second code instructions, and step (b) may accordingly comprise prior verification of the consistency of the models associated respectively with the first and second code instructions, i.e. verifying their bijection: everything that is contained in the one must be in the other and vice versa. It should be noted that this verification may be implemented automatically as the computer module is created, so as to return an error message (a warning) as soon as possible in the event of any inconsistency, i.e. at a stage where correction is easy and still inexpensive. If any inconsistency is detected, a signal indicating the anomaly is indeed emitted, and the method interrupted.

For this, the data processing means 11 implement one or more verification rules.

A first rule is that:
on the one hand each piece of information (input or output) involved in a relationship of a block is used at least once in the specifications of the capability corresponding to said block, and
on the other hand that each piece of information used in the specifications of a capability is defined in a relationship of the block corresponding to said capability.

In other words it verifies that they do not have a manifest contradiction between the architecture and specifications. Otherwise, it is already known that some specifications cannot be met by the architecture as it is and that corrections are necessary.

The second rule that can be verified for testing compliance is:
each outgoing piece of information of a block must be consumed by another block or sent outside the component;
each incoming piece of information in a block must be produced by another block or received by the component.

In other words it is verified that all the information (data/commands) consumed has been produced previously, and that all the information produced is consumed. Otherwise, it is already known that some specifications have not been met.

Figure 3A:
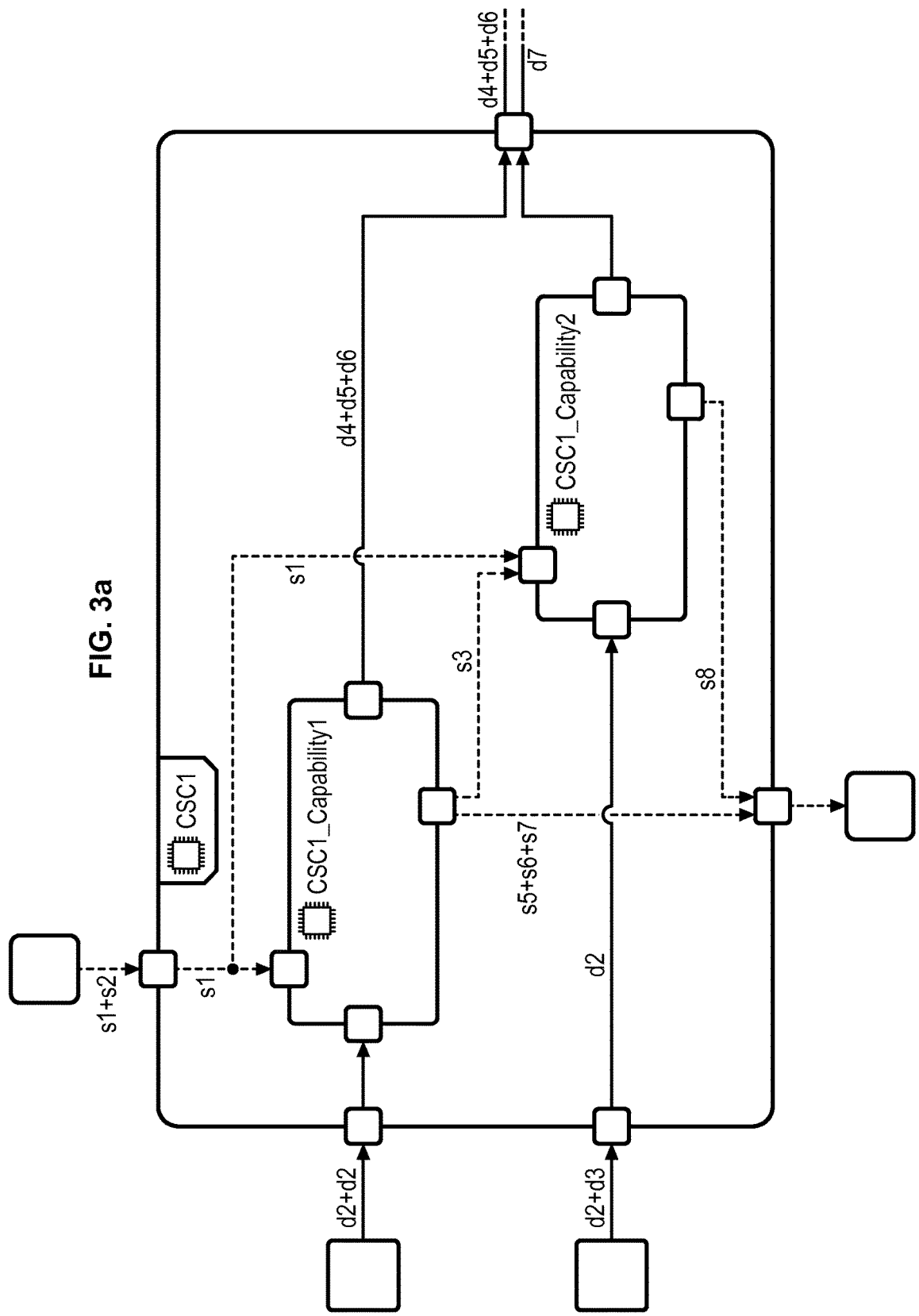
FIGS. 3a-3b compare an example of architecture of a computer module exhibiting a problem of consistency with the specifications, and the same example corrected.
Figure 3B:
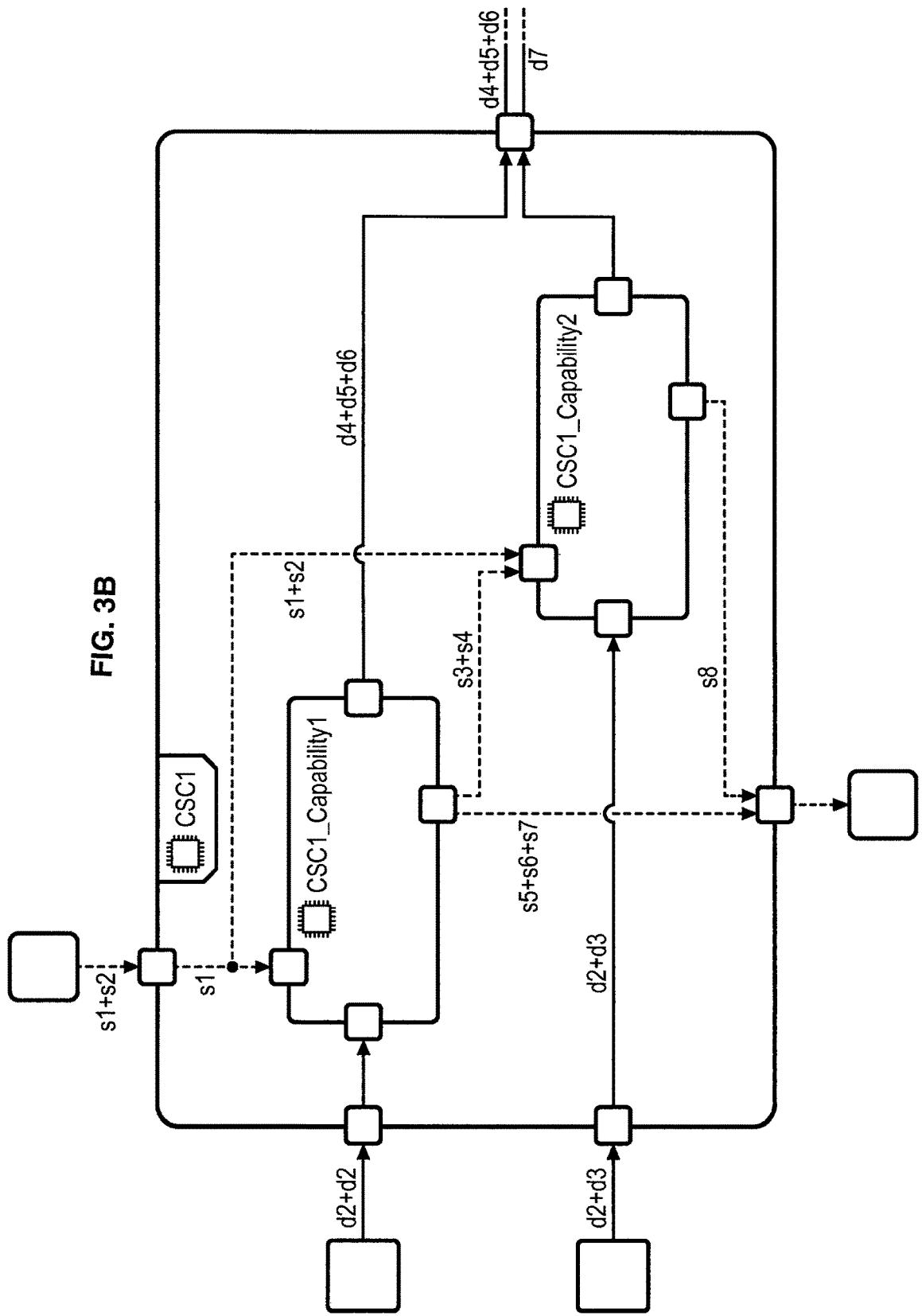

FIG. 3*a* represents an example of architecture for which the consistency is not verified, and FIG. 3*b* represents the same example corrected.

In FIG. 3*a*, the command s2 and the datum d3 received by the component CSC1 are not consumed by a block, the command s4 having to be exported by the block CSC1_Capability1 and be imported by the block CSC1_Capability2 is missing, the datum d9 received by the block CSC2_Capability1 is not imported by the component CSC2 unlike data d6 and d8 which are missing, the datum d11 produced by the block CSC2_Capability2 is not exported by the component CSC2, and the command s13 is exported by the component CSC2 whereas it is not produced by the block CSC2_Capability2.

An exception to these rules is that a piece of information is labeled "SPARE=true", i.e. "spare", which means that it is optional. This is, for example, the case of the command s10 in these examples.

Once step (b) is finished, it is considered that the equivalence between the architecture and the specifications is established. In a step (c), the data processing means 11 express from said consolidated model a graph in which the blocks (or capabilities) and the components are nodes, and the relationships and the flows (in other words the information inputs and/or outputs, whether they are local or to/from the outside of a component) are edges (in particular edges oriented in the production to consumption direction, i.e. arcs). In other words, the edges are representative of information exchanges between blocks (or to/from the outside).

For example, two vertices representing two blocks which respectively produce and consume the same information are connected by an arc. Alternatively, all the vertices representing blocks of a component are connected by an arc at the vertex representing the component if they import or export information from/to the outside of the component.

Preferably, the data and the commands are represented by two types of arcs so as to distinguish them.

In addition to Sirius mentioned before, EuGENia Live; AToM3 MetaEdit+ or Poseidon may be cited which make it possible to express a DSL as a graph.

It should be noted that the graphical representation of the architecture is already a graph in itself (there is no need to generate one), on condition that the vertices and the edges are clearly perceived. In the remainder of the present description, such representations will be used as examples of graphs. This step of expression thus consists only in identifying in the models the constituent entities of a graph in the mathematical sense, i.e. the vertices and the arcs.

Graph theory properties are used for identifying signs representative of the aforementioned testability problems.

Thus, in a step (d) a graph traversal algorithm is used for calculating the width and/or the depth of said graph: such graph traversal algorithms are known, optimized and make it possible to quickly obtain the required parameters.

"Graph width", is understood to mean the length of the longest chain linking two observable data, i.e. an input datum and an output datum of a component of the module. Thus it is the maximum transformation level of an input datum (only the "data flow" edges and not the "command flow" edges are followed). In other words, the width is the length of the longest data type information flow.

Figure 4A:
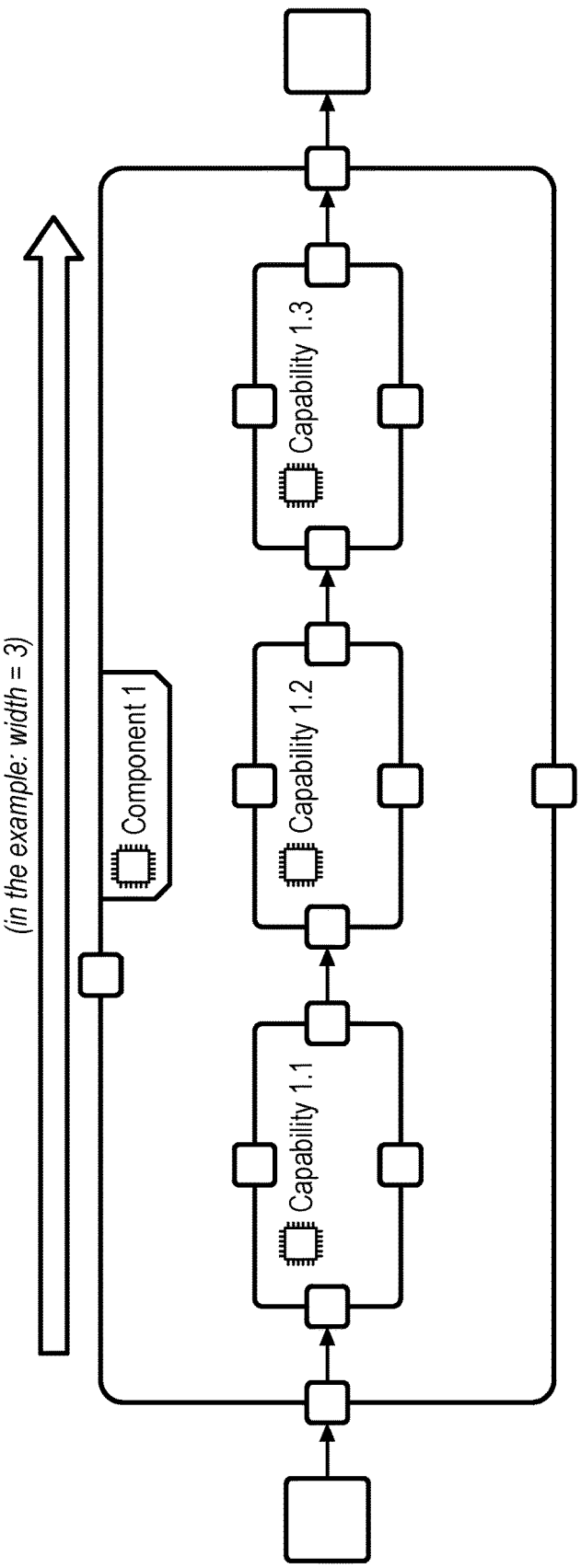
FIGS. 4a-4b illustrate the width and the depth of a graph used in the method according to the invention.

The width is expressed as the number of nodes (blocks) encountered, which is equal to the number of edges of the chain, less one. The width may be calculated component by component (subgraph width), and at the end the maximum value of the subgraph widths is taken as the width of the graph. Referring to the example in FIG. 4*a*, it is seen that three blocks must be traversed (that is, four edges) between the input and the output of the component Component1.

Similarly, "graph depth" is understood to mean the length of the longest chain linking two observable commands i.e. an input command and an output command of a component of the module, i.e. for further reformulating commands accessible from the terminals of a component of the module. Only the "command flow" edges and not the "data flow" edges are followed. In other words, the depth is the length of the longest command type information flow.

Figure 4B:
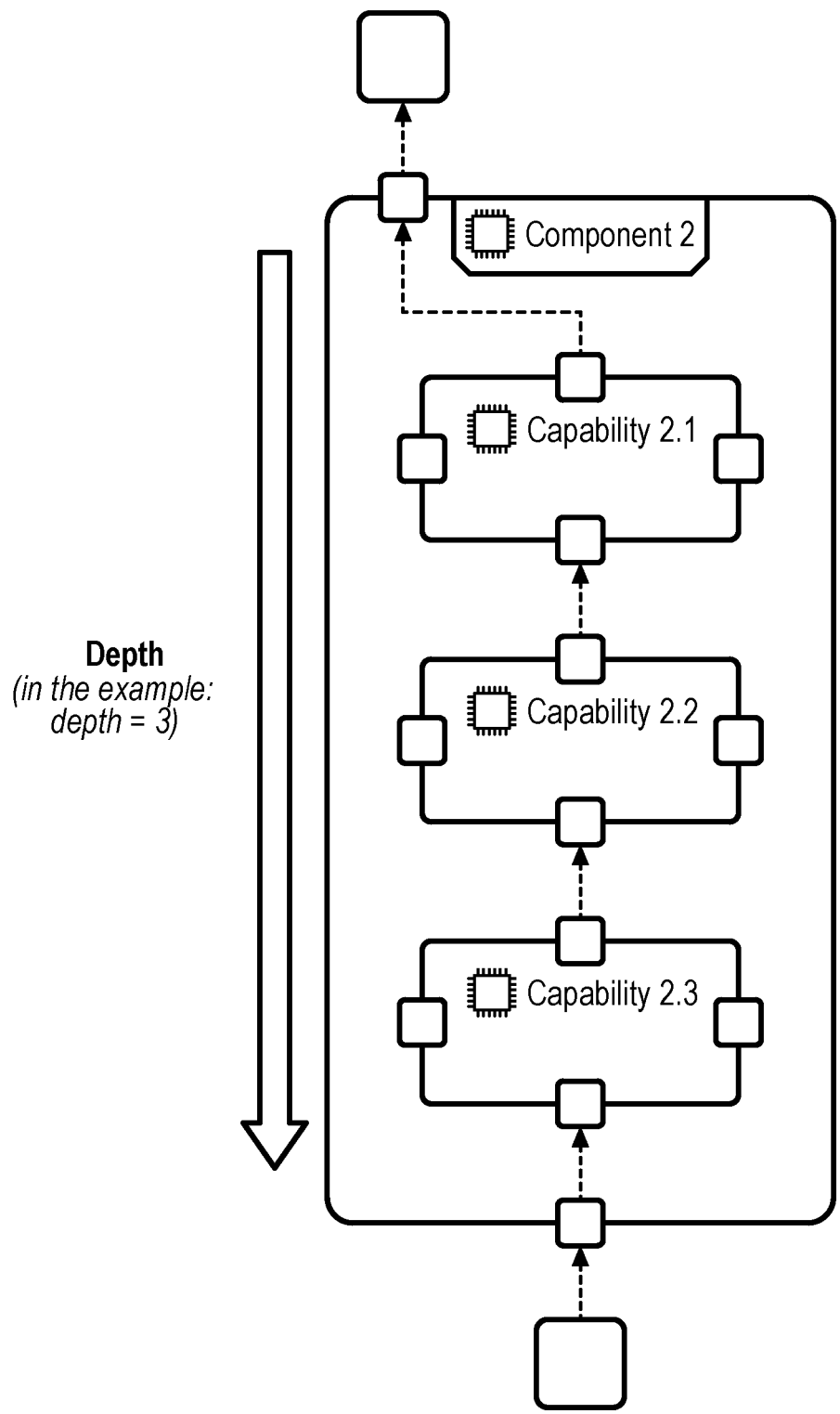

The depth is expressed as the number of nodes (blocks) encountered, which is equal to the number of edges of the chain, less one. The depth may be calculated component by component (subgraph depth), and at the end the maximum value of the depths is taken as the depth of the graph. Referring to the example in FIG. 4b, it is seen that three blocks must be traversed (that is, four edges) between the input and the output of the component Component1.

Noting that each chain from an input to an output of a component is cyclic (since the component is a start and end node), the width of the graph is the size less one of the largest cycle of data flow type edges, and the depth of the graph is the size less one of the largest cycle of command flow type edges.

Each of the two quantities width and depth are compared to a maximum threshold, and it is thus possible to be limited to a comparison of the maximum width and depth with a single threshold. This maximum may be directly calculated as the size less one of the largest cycle of edges.

The width and the depth of the graph are representative of a level of complexity of the module, and in particular of the accessibility of some capabilities during the requirements test. In practice, if at least one of said calculated width and depth is greater than a predefined threshold, some specifications are considered non-testable.

Such a threshold makes it possible to restrict the complexity and the granularity of the specifications of a component, in order to encourage raising the level of granularity of the requirements, introduce testability points, or split the component into subcomponents and introduce an incremental design approach.

The predefined threshold is configurable according to the intrinsic complexity of the module developed, but preferably it is at the maximum equal to three (both for the depth and the width). At lower levels (e.g. Configuration Software Unit, CSU in software), it may be chosen equal to two or even one. Indeed, taking the example of FIG. 4a, during the testing phase only the information received at the input of the component may be checked, and the information at the output of the component verified since only the component has a physical existence. Thus, in order to stimulate and observe the inputs/outputs of the capability 1.2 for ensuring that the implementation performed complies with the drafted requirements at the terminals of this capability, it is necessary to know the transformations performed by the intermediate capabilities (in this case by the capabilities 1.1 and 1.3): neither the input of the capability 1.2 nor its output is known with precision. If the capability 1.3 gives the right results, it may be assumed that the three capabilities 1.1 to 1.3 work, but it is not statistically impossible that two errors cancel each other out.

The fact of limiting to three or even less ensures sufficient visibility over the capabilities during the tests: no non-testability problem will be encountered. In practice, only a threshold equal to one makes it possible to have for all the capabilities all the inputs and all the outputs directly stimulable and observable.

Figure 5A:
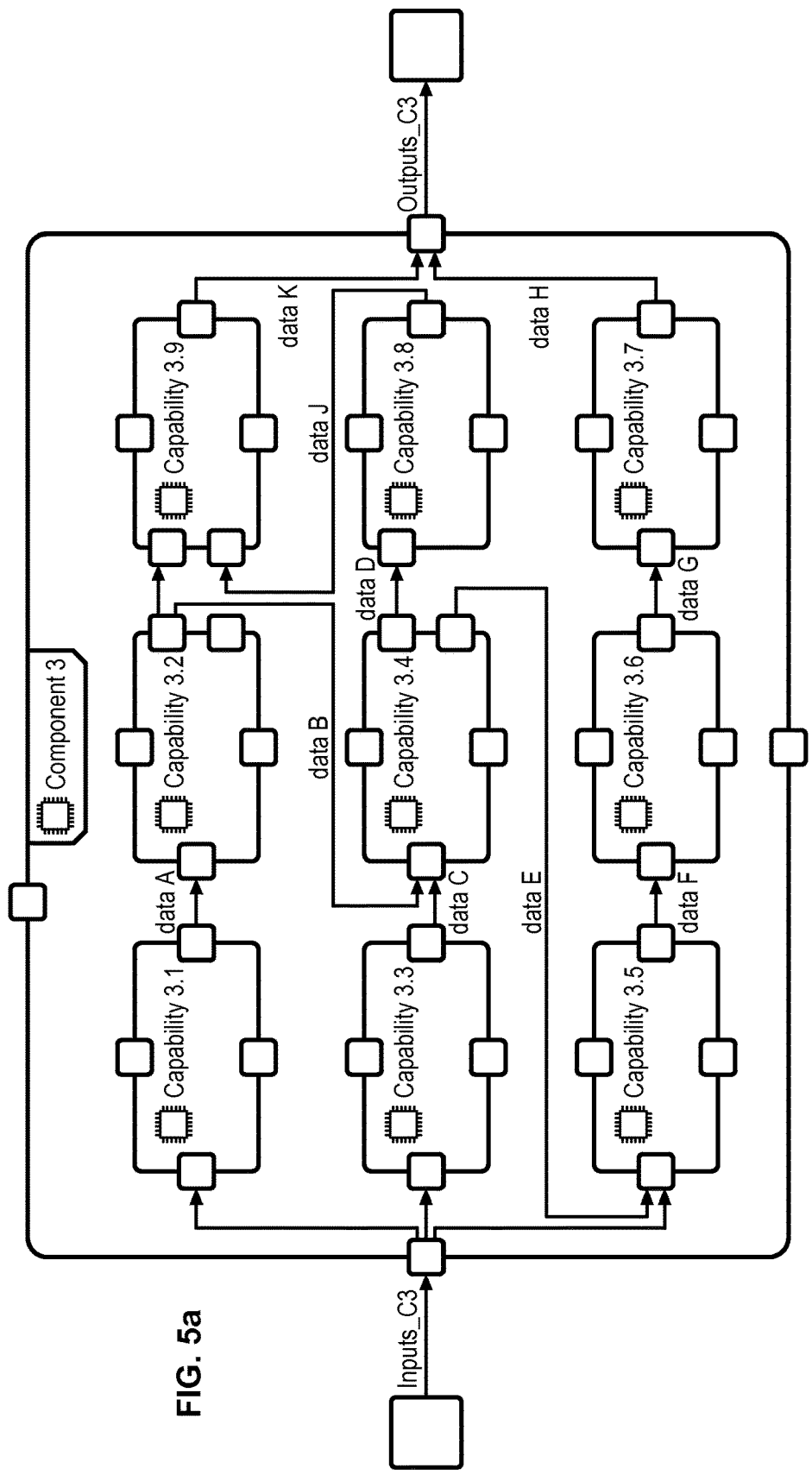
FIGS. 5a-5b compare an example of architecture of a computer module for which a non-testability is detected, and the same example corrected.

FIG. 5a represents a more complex example in which the width is six. Indeed the longest path is given by the capabilities 3.1+3.2+3.4+3.5+3.6+3.7. Thus in practice the data A, B, C, D, E, H and K are reliably observable (A, B, C, D and E are the result of a maximum of two capabilities, and H and K are directly observable via the output). Thus, the capabilities 3.6, 3.7 and 3.8 exhibit testability problems.

Figure 5B:
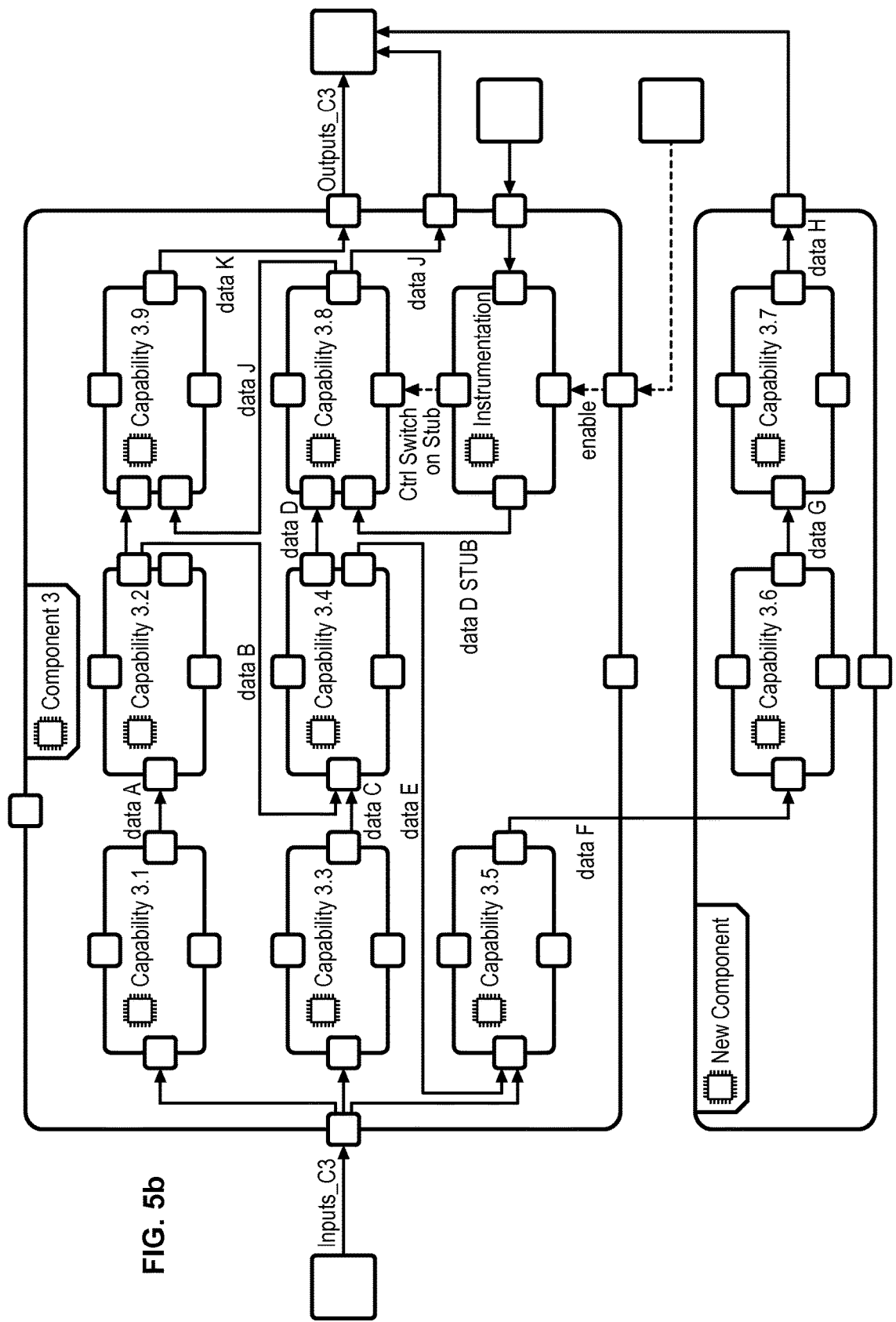

FIG. 5b represents a modification of the architecture of FIG. 5a making it possible, while respecting the same specifications, to limit the width of the graph to three (and therefore to make all the capabilities more easily testable).

For this, it is proposed first of all to take out the blocks corresponding to the capabilities 3.6 and 3.7 and to arrange them in a new component (New Component). The datum F becomes an output datum of the former component and an input datum of the new component, i.e. an observable datum.

Subsequently the testability of the capability 3.8 (and indirectly that of the capability 3.9) is improved thanks to the integration into the architecture of an instrumentation block which makes it possible to generate a test datum D ("stub"), which reduces the complexity for the data J and K. Thus, since the component 3.8 is instrumented, the longest path becomes 3.1+3.2+3.4.

In a final step (e), the testability of the module is assessed based on the calculated width/depth values (and if necessary additional consistency tests). In particular, a signal indicating a testability problem of the computer module is emitted (e.g. an error message on the interface 13) if at least one of said calculated width and depth is greater than the predefined threshold.

In the present case, if the predetermined threshold is three, the architecture of FIG. 5a would have led to the emission of said signal, but not that of FIG. 5b.

It should be noted that additional verifications may be implemented in this step. Notably, as represented by FIG. 6, it is possible to use additional thresholds relating to the number of components, the number of capabilities per component and the number of requirements per component.

Figure 6:
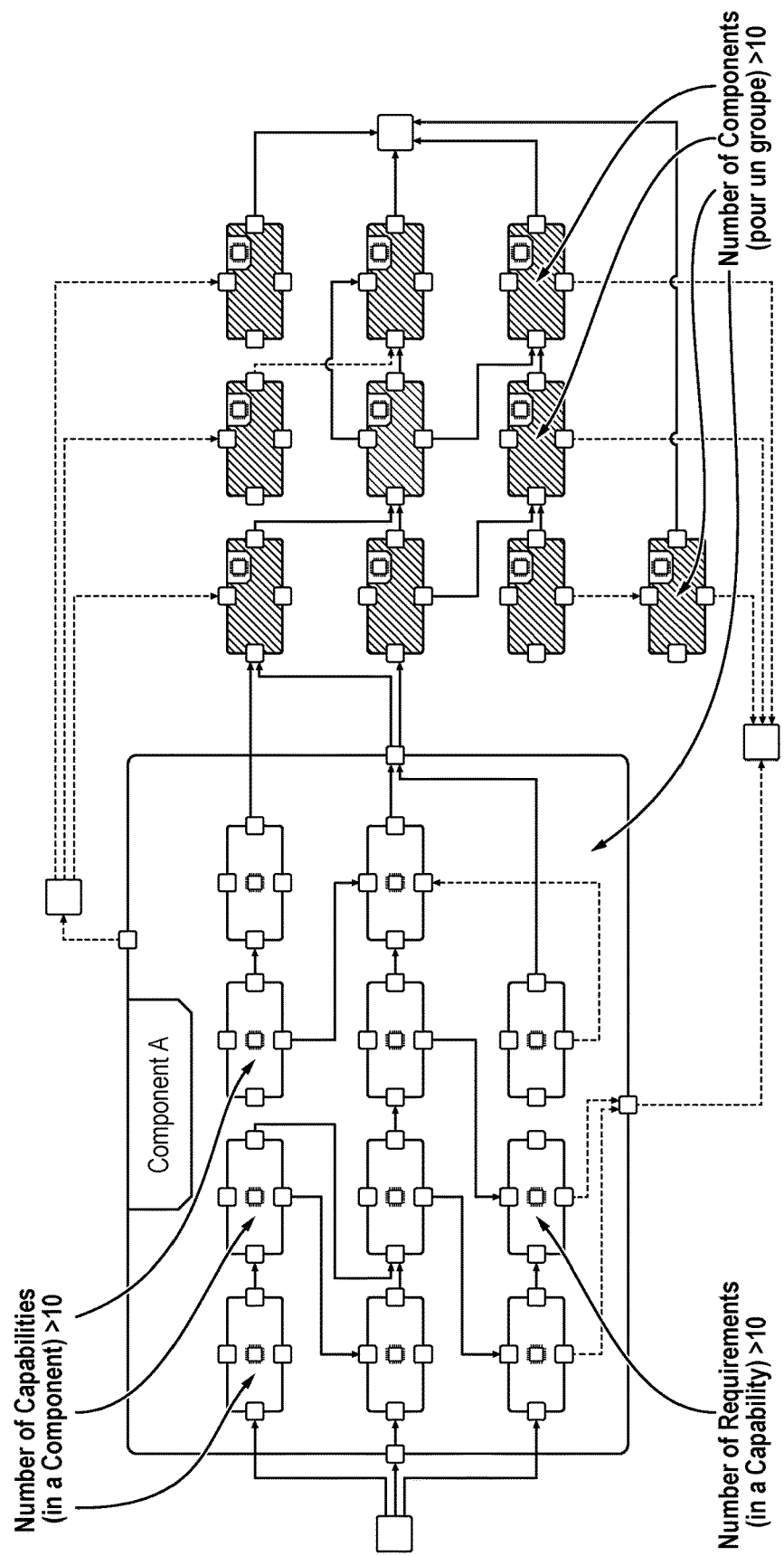
FIG. 6 represents an example of architecture of a computer module for which an over-specification is detected.

At a "high" level (known as HLR in software), 10 components×10 capabilities×10 requirements may be allowed to be handled (as represented in FIG. 6, which represents an example exceeding these thresholds and therefore characteristic of an over-specification), that is, 1000 requirements, which by feedback from experience is suited to the most complex systems, such as inertial navigation systems.

At a "low" level (known as LLR in software, for example CSU), 1 component×10 capabilities×10 requirements may be allowed to be handled (since the complexity threshold is limited to 1, there can be only one capability per component, which makes it possible to fully verify the requirements), that is, 100 requirements, which by feedback from experience is suited to the most complex systems, such as inertial navigation systems.

System

According to a second aspect, the invention relates to a device 1 for implementing the preceding method, i.e. detecting testability problems of a computer module defined:
  on the one hand by first code instructions in a modeling language, said first code instructions representing a plurality of blocks of said computer module distributed in one or more components and a plurality of relationships between the blocks and/or the components;
  on the other hand by second code instructions in a textual language, said second code instructions representing a list of specifications each associated with a capability and defining at least one information flow at the level of the capability.

The device 1 is in particular a station for generating computer code.

This device comprises the data processing means 11 (e.g. a processor) configured for implementing:

a module for expressing the first and second code instructions each in the form of a model instantiating a common metamodel matching on the one hand the blocks with the capabilities, and on the other hand said relationships with said information flows;

a module for synchronizing the models associated respectively with the first and second code instructions in a consolidated model;

a module for expressing from said consolidated model a graph in which the blocks and the components are nodes, and the relationships are edges;

a module for calculating by means of a graph traversal algorithm the width and/or the depth of said graph;

a module for emitting a signal indicating a testability problem of a computer module if at least one of said calculated width and depth is greater than a predefined threshold.

Computer Program Product

According to a third and a fourth aspect, the invention relates to a computer program product comprising code instructions (in particular on the processing means 11 of the device 1) for detecting testability problems of a computer module, as well as computer readable storage means (notably a memory 12 of the device 1) on which this computer program product is located.

The invention claimed is:

1. A method for detecting testability problems of a computer module defined:

by first code instructions in a modeling language, said first code instructions representing a plurality of blocks of said computer module distributed in one or more components and a plurality of relationships between the blocks and/or the components; and by second code instructions in a textual language, said second code instructions representing a list of specifications each associated with a capability and defining at least one information flow at the level of the capability;

the method being characterized in that it comprises implementing by data processing means of a device steps of:

(a) Expressing the first and second code instructions each in the form of a model instantiating a common metamodel matching the blocks with the capabilities, and matching said relationships with said information flows;

(b) Synchronizing the models associated respectively with the first and second code instructions in a consolidated model;

(c) Expressing from said consolidated model a graph in which the blocks and the components are nodes, and the relationships are edges;

(d) Calculating by means of a graph traversal algorithm the width and/or the depth of said graph;

(e) Emitting a signal indicating a testability problem of the computer module if at least one of said calculated width and depth is greater than a predefined threshold;

wherein the width of the graph corresponds to the largest number of blocks along a path in the edges of the graph representative of data type information flows, between two observable data type pieces of information; and/or the depth of the graph corresponds to the largest number of blocks along a path in the edges of the graph representative of command type information flows, between two observable command type pieces of information.

2. The method as claimed in claim 1, wherein said modeling language is a graphical programming language, and said textual language is a requirement description language.

3. The method as claimed in claim 1, wherein said predefined threshold is three.

4. The method as claimed in claim 1, wherein step (d) also comprises calculating the number of components in the computer module, the number of blocks for each component, and the number of specifications for each block, step (e) also comprising emitting a signal indicating a testability problem of the computer module if at least one of these calculated numbers is greater than a predefined threshold.

5. The method as claimed in claim 1, wherein step (b) first comprises verifying the consistency of the models associated respectively with the first and second code instructions, step (e) also comprising emitting a signal indicating a testability problem of computer module if at least one inconsistency is identified between the models.

6. The method as claimed in claim 1, wherein an observable piece of information is an input or output piece of information of a component, or a piece of information provided by an instrumentation block.

7. The method as claimed in claim 1, comprising a subsequent step (f) of generating code instructions in a procedural programming language from the first code instructions if no testability problem is reported in step (e).

8. The method as claimed in claim 7, comprising a subsequent step (f) of instantiation, in a system, of said code instructions generated in a procedural programming language.

9. A device for detecting testability problems of a computer module defined:

by first code instructions in a modeling language, said first code instructions representing a plurality of blocks of said computer module distributed in one or more components and a plurality of relationships between the blocks and/or the components; and by second code instructions in a textual language, said second code instructions representing a list of specifications each associated with a capability and defining at least one information flow at the level of the capability;

the device being characterized in that it comprises data processing means configured for implementing:

a module for expressing the first and second code instructions each in the form of a model instantiating a common metamodel matching the blocks with the capabilities, and matching said relationships with said information flows;

a module for synchronizing the models associated respectively with the first and second code instructions in a consolidated model;

a module for expressing from said consolidated model a graph in which the blocks and the components are nodes, and the relationships are edges;

a module for calculating by means of a graph traversal algorithm the width and/or the depth of said graph;

a module for emitting a signal indicating a testability problem of the computer module if at least one of said calculated width and depth is greater than a predefined thresholds;

wherein the width of the graph corresponds to the largest number of blocks along a path in the edges of the graph representative of data type information flows, between two observable data type pieces of information; and/or the depth of the graph corresponds to the largest number of blocks along a path in the edges of the graph representative of command type information flows, between two observable command type pieces of information.

10. A non-transitory computer readable storage means on which a computer program product comprises code instructions for executing a method as claimed in claim 1 for detecting testability problems of a computer module.

* * * * *